Patented Nov. 18, 1941

2,263,483

UNITED STATES PATENT OFFICE 2,263,483

STABILIZING FROZEN CONFECTIONS

Lewis A. Baumann, Chevy Chase, Md., assignor to The Permagel Company, Washington, D. C., a corporation of the District of Columbia No Drawing. Application August 29, 1940,
Serial No. 354,773

12 Claims. (Cl. 99—136)

This invention relates to new food stabilizing compositions. More particularly it relates to food stabilizing compositions comprising finely divided seed coatings of seeds of the Plantago family. Still more particularly it relates to food stabilizing compositions containing finely divided seed coatings of the Plantago family and finely divided solid edible buffering substances. In one of its aspects it relates to the stabilization of frozen confections such as ice creams, ices, sherbets, and the like with stabilizing compositions comprising finely divided seed coatings of seeds of the Plantago family. More particularly it relates to the stabilization of such frozen confections with stabilizing compositions comprising finely divided seed coatings of the above-mentioned type and finely divided edible buffering substances. The invention also relates to such stabilized compositions as new compositions of matter.

This invention has for an object the provision of a new and improved stabilizer for food products, especially milk and dairy products, and particularly frozen dairy products. A further object is to provide a stabilizer for ice creams, water ices and sherbets which is economical and has no objectionable odor, taste or color. A still further object is to provide such a stabilizer which can be easily used and admixed with the aqueous components of ice creams, ices and sherbets. A further object is to produce an ice cream which is stabilized against deterioration and does not tend to develop objectionable tastes and flavors. A further object is to produce an ice cream which is smooth, homogeneous and free from large ice crystals. An additional object is to produce a food stabilizing composition which is of general utility. Still other objects will be apparent to those skilled in the art from a consideration of the hereinafter described invention.

It has been found that finely divided seed coatings from seeds of the Plantago family constitute valuable food stabilizing compositions which have general utility in the arts. It has been further found that if edible buffering substances are admixed with such finely divided seed coatings, the resulting mixtures are of considerable importance for stabilizing food substances. They are of especial utility with foods which contain water at some stage of their preparation or use. They are particularly useful in stabilizing frozen confections such as ice creams, ices and sherbets. Other edible substances such as dispersing agents, e. g. sugar, flavoring agents, etc. may be compounded therewith.

The proportions of the ingredients in the food stabilizing compositions may vary considerably depending on the use to which they are put. In general, however, they comprise from 1 to 5 parts of the finely divided seed coatings to 1 to 2 parts of the solid edible buffering substance to 0.5 to 5 parts of the solid dispersing agent.

Various types of solid, edible buffering substances may be used. Thus, they may be organic or inorganic weak acids or weak bases or acid salts or basic salts. Suitable substances include sodium carbonate, sodium bicarbonate, sodium citrate, sodium tartrate, sodium lactate, sodium acetate and the corresponding potassium compounds; citric acid, tartaric and lactic acids, sodium acid phosphate, potassium acid phosphate, etc.

In the case of frozen confections, the pH of the final product has some significance in the nature and amount of the buffering substance used. For ice creams the material is generally regulated so that a pH of 6.5 to 7 is attained in the final product. For ices the pH range may in general range from 2 to 5 and for sherbets from about 4 to 6.

In the manufacture of ice cream various dairy products, such as butter, cream, milk, including skim milk, plain or sweetened condensed or evaporated milk, and milk powders, etc., are mixed in such proportions as to give a definite predetermined content of butter fat and milk solids which is different and more concentrated than in an original milk. To this mixture is added sugar and some form of filler such as corn starch, a water-soluble gum, gelatin, etc.

The mixture is then pasteurized, homogenized and cooled. Subsequently it is subjected to a freezing and beating operation wherein definite and predetermined amounts of air are incorporated and the mixture becomes partially frozen. This partially frozen mixture is then drawn into containers and further frozen. The final product contains various parts of water which tend to crystallize out.

It has been found that the addition of the finely divided seed coatings from the Plantago family alone in small amounts, e. g. from about 0.1 to 2% by weight to ice cream mixes stabilize the resulting ice cream and render it smooth, homogeneous, free from objectionable tastes, odors and ice crystals. They are useful with various fruits, fruit juices, syrups, flavoring agents used in frozen confections.

Better results are obtained by the use of compositions containing in addition to the finely divided seed coats a buffering salt, acid or base. Solid dispersing agents such as sucrose, dextrose, and milk powders may be mixed with the seed powders which enables them to stabilize compositions more readily incorporated into the ice cream mix. These features constitute important aspects of the invention.

The finely divided seed coatings can be prepared in various ways by grinding or disintegrating seeds of the Plantago family until a fine powder, for instance, of at least 50 mesh, is produced. The entire seeds can be ground up or the seed coatings can be removed and ground or comminuted. A practical way for doing this is set forth in Parsons U. S. Patent 1,975,731. The effective stabilizing ingredients are apparently contained in the mucilaginous coatings of the seeds, and the inner portions or woody centers have an insignificant if any stabilizing value. The use of the entire seed is not always desirable because of the bulk of the centers. The finely divided seed materials are, therefore, preferably composed of the seed coatings only.

After grinding the seed coatings, various water-soluble edible buffer salts which are preferably in a finely divided state are mixed with the finely divided seed coating until they are uniformly distributed therethrough. The buffer salts in one sense alter the mineral balance of the coating and the hydrogen ion concentration.

Finally, solid edible dispersing agents can be mixed with the just-described powders. It is not necessary to carry out the steps in the order named. For example, a dispersing agent and a buffer compound can be added at the same time. It is possible to add them at the grinding stage for the seed coating. One or more buffer substances or dispersing agents can be used.

The stabilizing compositions can then be added to various foods in the desired amount by admixing at any desired stage.

The invention shall now be further illustrated, but is not intended to be limited by the following examples wherein the parts stated are parts by weight.

*Example I*

Two parts of seed coatings from seeds of the Plantago family ground to about 50 mesh is mixed with about 1 part of trisodium phosphate and 1 part of sodium citrate.

The resulting composition is added to a conventional ice cream mix comprising milk, butter fat, sugar and flavoring in an amount not more than 0.5% of the total weight of the mix. The final mixture is smooth, homogeneous and has a satisfactory hydrogen ion concentration. After aging it is found to have an excellent stabilizing action and is free from objectionable tastes and odors. The mixture is furthermore free from ice crystals.

*Example II*

Two parts of the seed coatings from Plantago seeds are ground to at least 50 mesh and admixed with 1 part of citric acid, 1 part of tartaric acid and 1 part of sodium acid phosphate.

The resulting powder is added to a water-ice mix containing the usual ingredients in an amount of 0.7 part by weight of the water-ice mix. The resulting "ice" has a desirable hydrogen ion concentration and ages well on storage. The seed mixture has a good stabilizing effect.

*Example III*

One part of the seed coatings described in Example I were uniformly mixed with 1 part of citric acid and 1 part of sodium acid phosphate. The resulting powder is added to a sherbet mix in such an amount that it constitutes about 0.6% by weight of the total volume.

In place of the specific buffer substances set forth in the above examples may be substituted one or more of the aforementioned compounds of this type in a similar amount.

To the stabilizing compositions of Examples I to III may be added sucrose, dextrose, milk powders, etc., to enable a more rapid blending with the frozen confections.

Various species of seeds from the Plantago family can be used as a source for the novel compositions hereof. As examples of suitable species mention is made of *Ocymum pilosum*, *Lepidum sativum*, *Plantago psyllium*, *Plantago lanceolata*, *Plantago loeflingii*, *Plantago royaleana*, and *Plantago ovata*.

The above stabilizing compositions are not limited to frozen confections wherein they are very effective and preserve the emulsions, but on the contrary, may be used in other food products. For instance, they may be used in the baking industry.

This invention has a number of advantages which will be readily apparent to those skilled in the art. It provides an inexpensive and effective food stabilizer which can be used by the ordinary operator. Another advantage is the stabilizer does not add objectionable oils or tastes to foodstuffs. A further advantage resides in the fact that the water content of frozen confections is stabilized. Objectionable large ice crystals are inhibited. The butter fat portion of ice cream, for instance, remains effectively dispersed against deterioration.

As many apparently widely different embodiments of this invention may be made without departing from the spirit and scope thereof, it is to be understood that I do not limit myself to the specific embodiments hereof except as defined in the appended claims.

I claim:

1. A frozen confection containing uniformly distributed therethrough a small amount of a stabilizing agent consisting of finely divided seed coating from seeds of the Plantago family.

2. A frozen confection having uniformly distributed therethrough from 0.1% to 2.0% of a stabilizing agent consisting of finely divided seed coatings from seeds of the Plantago family.

3. A frozen confection containing uniformly distributed therethrough a small amount of a stabilizing agent consisting of finely divided seed coatings from seeds of the Plantago family and a solid edible buffering substance.

4. A frozen confection containing uniformly distributed therethrough a small amount of a stabilizing agent consisting of finely divided seed coatings from seeds of the Plantago family and a solid dispersing agent.

5. A composition as set forth in claim 4 wherein said dispersing agent is dextrose.

6. A frozen confection taken from the class consisting of ice creams, water ices and sherbets containing in stabilizing amounts a stabilizing agent consisting of finely divided seed coatings from seeds of the Plantago family.

7. A frozen confection taken from the class consisting of ice creams, water ices and sherbets containing in stabilizing amounts a composition comprising essentially a mixture of 1 to 5 parts of finely divided seed coatings from seeds of the Plantago family and 1 to 2 parts of a finely divided solid edible buffering substance.

8. A frozen confection taken from the class consisting of ice creams, water ices and sherbets containing in stabilizing amounts a composition of matter comprising essentially a mixture of a stabilizing agent consisting of finely divided seed coatings from seeds of the Plantago family, at least one finely divided solid edible buffering substance and at least one solid edible dispersing agent.

9. The process of stabilizing frozen confections which comprising adding in a small amount to the mix a stabilizing agent consisting of finely divided seed coating from seeds of the Plantago family.

10. The process of stabilizing frozen confections which comprises adding to the mixture from 0.1 to 2% of a stabilizing agent consisting essentially of finely divided seed coatings from Plantago ovata seeds, and a solid edible dispersing agent.

11. An ice cream composition having uniformly distributed therethrough from 0.1% to 2.0% of a stabilizing agent consisting of finely divided seed coatings from seeds of the Plantago family, a solid edible buffering substance and a solid edible dispersing agent, said composition having its pH regulated from 6.5 to 7.0.

12. A sherbet composition having uniformly distributed therethrough from 0.1% to 2.0% of a stabilizing agent consisting of finely divided seed coatings from seeds of the Plantago family, a solid edible buffering substance and a solid edible dispersing agent, said composition having its pH regulated from 4 to 6.

LEWIS A. BAUMANN.